United States Patent [19]
Basham et al.

[11] Patent Number: 5,692,014
[45] Date of Patent: Nov. 25, 1997

[54] SUBSAMPLED CARRIER RECOVERY FOR HIGH DATA RATE DEMODULATORS

[75] Inventors: Jack K. Basham, Los Angeles; Keith K. Yamashiro; Pascal G. Finkenbeiner, both of Torrance, all of Calif.; Thomas J. Kolze, Phoenix, Ark.

[73] Assignee: TRW Inc., Redondo Beach, Calif.

[21] Appl. No.: 383,381

[22] Filed: Feb. 3, 1995

[51] Int. Cl.⁶ .............................. H04L 27/22; H04L 7/00
[52] U.S. Cl. .................. 375/326; 375/355; 375/329
[58] Field of Search ...................... 375/355, 326, 375/268, 261, 302, 271, 316, 322, 329, 340, 327; 455/161.1; 329/306, 307, 308, 302; 327/299, 98, 94; 364/724.1

[56] References Cited

U.S. PATENT DOCUMENTS

| | | | |
|---|---|---|---|
| 4,320,517 | 3/1982 | Godard et al. | 375/355 |
| 4,599,732 | 7/1986 | LeFever | 375/355 |
| 4,701,934 | 10/1987 | Jasper | 375/206 |
| 4,815,103 | 3/1989 | Cupo et al. | 375/355 |
| 5,001,727 | 3/1991 | McDavid | 375/326 |
| 5,025,455 | 6/1991 | Nguyen | 375/327 |
| 5,042,052 | 8/1991 | Roberts et al. | 375/344 |
| 5,072,196 | 12/1991 | Rousselet et al. | 375/344 |
| 5,081,652 | 1/1992 | Farahati et al. | 375/344 |
| 5,115,454 | 5/1992 | Kucar | 375/321 |
| 5,148,451 | 9/1992 | Otani et al. | 375/344 |
| 5,150,384 | 9/1992 | Cahill | 375/375 |
| 5,157,694 | 10/1992 | Iwasaki et al. | 375/327 |
| 5,170,415 | 12/1992 | Yoshida et al. | 375/355 |
| 5,173,925 | 12/1992 | Mizoguchi | 375/232 |
| 5,216,696 | 6/1993 | Poklemba | 375/355 |
| 5,233,631 | 8/1993 | Labat et al. | 375/327 |
| 5,247,543 | 9/1993 | Tsuda et al. | 375/325 |
| 5,255,290 | 10/1993 | Anvari | 375/344 |
| 5,268,647 | 12/1993 | Ichiyoshi | 329/30 X |
| 5,271,041 | 12/1993 | Montreuil | 375/326 |
| 5,276,706 | 1/1994 | Critchlow | 375/343 |
| 5,276,710 | 1/1994 | Iwasaki | 375/332 |
| 5,280,538 | 1/1994 | Kataoka et al. | 375/329 |
| 5,287,067 | 2/1994 | Denno et al. | 375/304 |
| 5,289,506 | 2/1994 | Kitayama et al. | 375/344 |
| 5,295,162 | 3/1994 | Zarembowitch | 375/329 |
| 5,301,210 | 4/1994 | Vandamme et al. | 375/329 |
| 5,311,546 | 5/1994 | Paik et al. | 375/232 |
| 5,315,619 | 5/1994 | Bhatt | 375/340 |
| 5,315,620 | 5/1994 | Halawani et al. | 329/304 |
| 5,375,146 | 12/1994 | Chalmers | 375/350 |
| 5,425,057 | 6/1995 | Paff | 375/326 |

OTHER PUBLICATIONS

Jeff Kirsten, "Undersampling reduces data-acquisition costs for select applications," EDN, pp. 217–228, 1990.

*Primary Examiner*—Tesfaldet Bocure
*Attorney, Agent, or Firm*—Michael S. Yatsko

[57] ABSTRACT

A high performance, low cost technique for carrier recovery and tracking of high rate demodulator (>200 Mbps to multi-gigabits per second) system is presented. The locally generated carrier is held in phase locked synchronism with the incoming modulated carrier through a carrier recovery scheme in which the modulated data is detected and subsampled using the bit synchronizing circuitry to provide a strobe signal for subsampling. The voltage levels of the subsampled data are analyzed to determine a phase error signal. The subsampled data are used to address a lookup table of error values stored in memory.

34 Claims, 3 Drawing Sheets

SUBSAMPLED CARRIER RECOVERY FOR HIGH DATA RATE DEMODULATORS

BACKGROUND OF THE INVENTION

1. Field of the Invention

The present invention relates generally to signal communications systems in which information is placed on a carrier for transmission. More particularly, the invention relates to a system for recovery of the carrier which employs a subsampling technique.

2. Description of the Related Art

In communications systems, including digital communications systems, it is customary to impress the information to be conveyed onto a radio frequency carrier by one of a number of different modulation techniques. For some time the trend has been to strive for higher and higher data transfer rates and wider channel bandwidths. This trend has seen the use of higher and higher carrier frequencies to convey the data at these higher rates.

In order to use the data after it has been transmitted it is necessary to extract the data from its carrier. This is typically done in a receiver by means of a process known as demodulation or detection. While there are many different demodulation and detection schemes, many of these schemes rely on having the ability to locally generate or extract a carrier signal, which is in turn used to extract the data signal from its carrier.

At low data transfer rates the techniques for obtaining a usable carrier signal are largely successful and fairly straightforward to implement. However, at higher data transfer rates conventional techniques do not work well and are difficult and expensive to implement. For example, one conventional technique is the DEMOD/REMOD technique. The DEMOD/REMOD technique produces a carrier by remodulating the input signal with the inverse of all data carried on the incoming signal thereby leaving an unmodulated carrier. The unmodulated carrier is then processed by conventional means. The DEMOD/REMOD technique relies on precise timing or synchronism between the incoming and demodulated signals. The relative cost of this technique is high due to the signal processing being implemented at RF/IF frequencies where the components have relatively high cost.

Another technique is the Costas loop in which a baseband-derived error signal is generated and used in the control loop. The Costas loop technique relies on a known trigonometric relationship between the in-phase and quadrature signals to derive an error signal. The Costas architecture operating at the full baud rate has a low order of difficulty at low data rates but becomes extremely difficult at rates above 200 Mbps. Wide fractional bandwidth, d.c. coupled and time stable baseband multipliers are the dominant difficulty.

Another technique, the X4 multiplier, squares the signal twice (i.e., signal 4) in the case of QPSK (SQPSK) to remove the modulation from the input signal. This scheme is avoided at high data rates due to the unacceptable AM/PM and AM/AM variation in the multipliers. This scheme also leads to very high processing frequencies (e.g. 15 GHz input processed at 60 GHz) which makes the hardware very expensive and acceptable performance is difficult to obtain. Downconverters can be used between the X2 stages but the fractional bandwidths become large and the added components increase the carrier phase stability problem.

SUMMARY OF THE INVENTION

The present invention overcomes the limitations of conventional systems by providing a high performance, low cost carrier recovery technique capable of different uses which will work well into the multi-gigabit per second range and which will track out reference error-induced crosstalk in true servoloop fashion. The architecture of the present system permits direct demodulation of the input signal. That is, demodulation can operate at the antenna frequency. Frequency downconverters are not required. This results in a lower cost system with improved bit error rate performance. In addition, the architecture handles both random and nonrandom data formats without the need for wideband DC coupled multipliers. The architecture also provides easy to implement but powerful phase and carrier lock detection in which the phase detector gain can be established independent of the input signal levels. Moreover, the architecture can handle a wide range of input frequencies, data rates and modulation types. Through the use of phase detector and lock detector programmable memory circuits of any type, the system can be programmed to support a variety of different modulation types without the need to alter the supporting circuitry. In other words, the lock detector and phase detector characteristics are independent of input frequency and data rate.

In accordance with the invention, a subsampling carrier recovery scheme is implemented in which the input modulated signal is detected and the detected data is then subsampled to obtain subsampled data representing every $N^{th}$ bit (on average) of the demodulated data. Although subsampling can be effected in a number of different ways, the presently preferred embodiment subsamples at a frequency 4 to 80 times lower than the frequency of the demodulated data stream. For example, a 100 megabit data signal may be subsampled every $5^{th}$ bit. This technique is based on the concept that the phase detector information (which controls the loop parameters) needs to be "updated" at a rate just sufficiently high to satisfy input signal frequency offset, loop signal to noise ratio (SNR) and carrier recovery loop tracking bandwidth and therefore can be driven by samples of every $N^{th}$ symbol.

Next, the subsampled data is processed using the appropriate phase and lock detector characteristic to obtain a feedback signal. Due to the subsampling, the carrier recovery processor is working with low frequency data (e.g. 4 to 80 times lower than the detected data stream). At these rates, inexpensive TTL and CMOS components can be used to perform the carrier recovery and tracking loop processing.

More specifically, the modulated input signal is fed to a detector circuit and the detected output signal or signals are fed to bit synchronizing circuits which include a clock recovery circuit used to recover the clock of the incoming data stream. The recovered clock signal is used in the bit synchronizing circuits in the usual fashion. In addition, the recovered clock/N (clock of $1/N^{th}$ the frequency) is also used to strobe the detected data through an analog to digital converter at a rate or frequency slower than the data rate. [Note with the state-of-the-art for analog to digital (A/D) converters advancing to gigasample rates, this architecture even enables future reduction of hardware and improvement of performance by using A/Ds at the full baud rate. The most significant bit (MSB) of the A/D (after digital d.c. offset correction) replaces the type D flip-flop for providing the hard decision outputs, and the full rate A/D words are subsampled for the carrier recovery processing.] This subsampled digital representation of the detected data is input to the carrier recovery loop processor (digital phase detector, loop filter and digital to analog converter) which generates a local oscillator control voltage. This local oscillator (the recovered carrier) is used as a reference for the in-phase (I)

and quadraphase (Q) detector. The digital subsampled signals are also used for carrier lock indication and to drive a low speed constellation analyzer or other post-processing equipment such as equipment for performing real time BER estimation and for driving distortion mitigation units (e.g. Crosspol Canceller, Adaptive Equalizers). For a more complete understanding of the invention, its objects and advantages, reference may be had to the following specification and to the accompanying drawings.

DETAILED DESCRIPTION OF THE PREFERRED EMBODIMENTS

Figure 1:
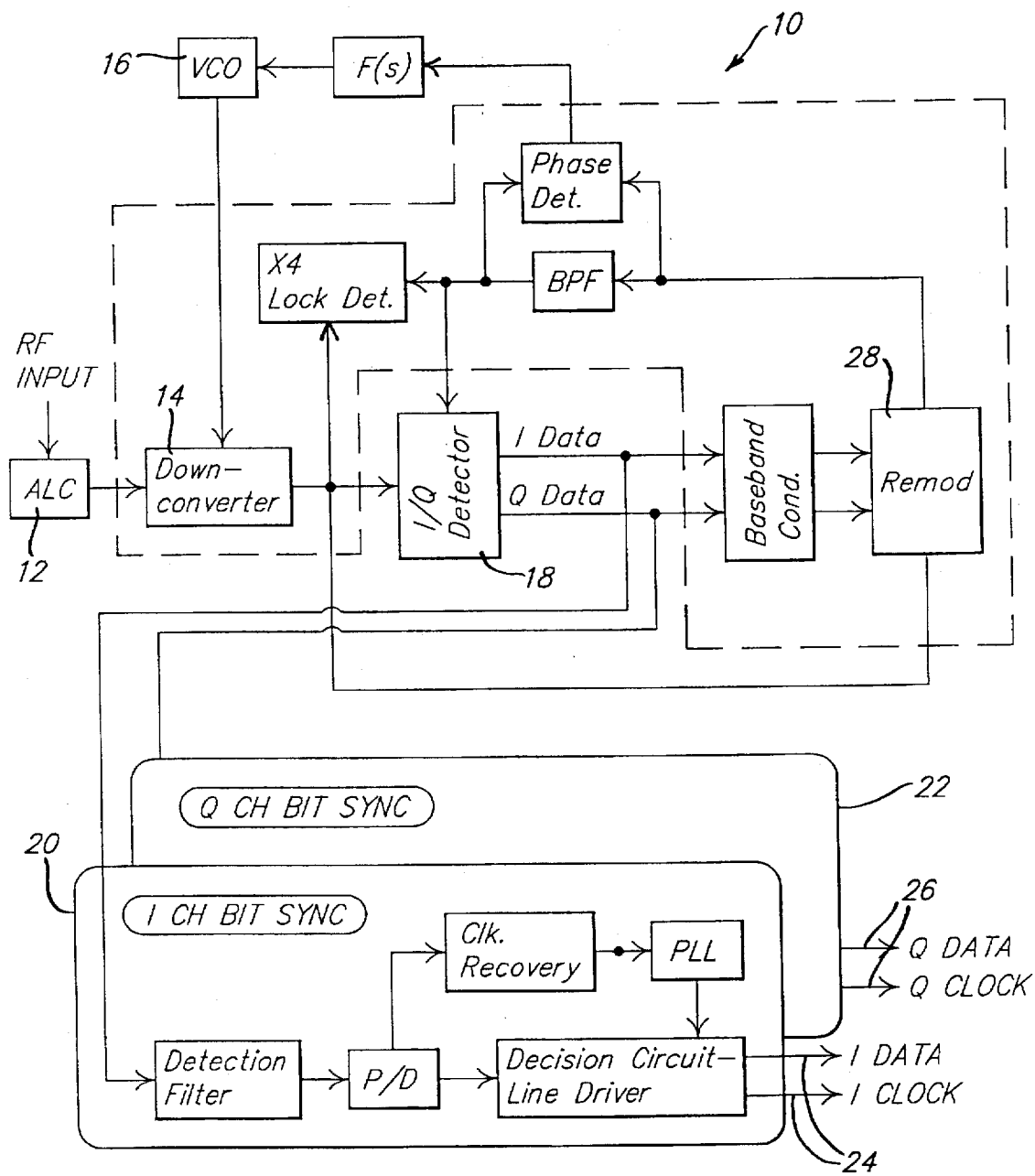
FIG. 1 illustrates a prior art DEMOD/REMOD circuit architecture.

Before giving a description of the invention in its presently preferred form, a more detailed description of a prior art carrier recovery technique will be presented for comparison purposes. Referring to FIG. 1, a receiver circuit 10 utilizing prior art DEMOD/REMOD technology has been illustrated. The modulated input signal is applied to automatic level control (ALC) circuit 12 and thereafter to downconverter circuit 14. The downconverter circuit is supplied with a locally generated carrier from voltage controlled oscillator (VCO) 16. Essentially, downconverter 14 operates on the radio frequency input signal by downconverting the signal to a lower frequency or intermediate frequency carrier. The need for a downconverter adds complexity and degrades the performance of the conventional prior art system. Once downconverted, the RF signal is then supplied to the detector circuit 18 which extracts the data from the carrier. In the illustrated embodiment it has been assumed that the data comprises both in-phase and quadrature signals, thus detector 18 has been illustrated as an I/Q detector which provides both I data and Q data output.

Ultimately, it is this I data and Q data which serves to convey the transmitted information. Thus it is necessary to synchronize with these data streams in order to extract the information from them. The I and Q channel bit synchronizing circuits 20 and 22 perform this function. In essence, the I and Q channel bit synchronizing circuits extract a clock from the digital data stream and provide that clock along with the data best estimate (hard decision) as outputs at 24 and 26, respectively. These outputs provide the information carrying data in a form suitable for use by digital processing circuitry.

The I data and Q data outputs of the detector 18 are also fed to the remodulator circuit 28. The detected data reverse modulates the input modulated signal thereby generating the desired recovered carrier.

Figure 2:
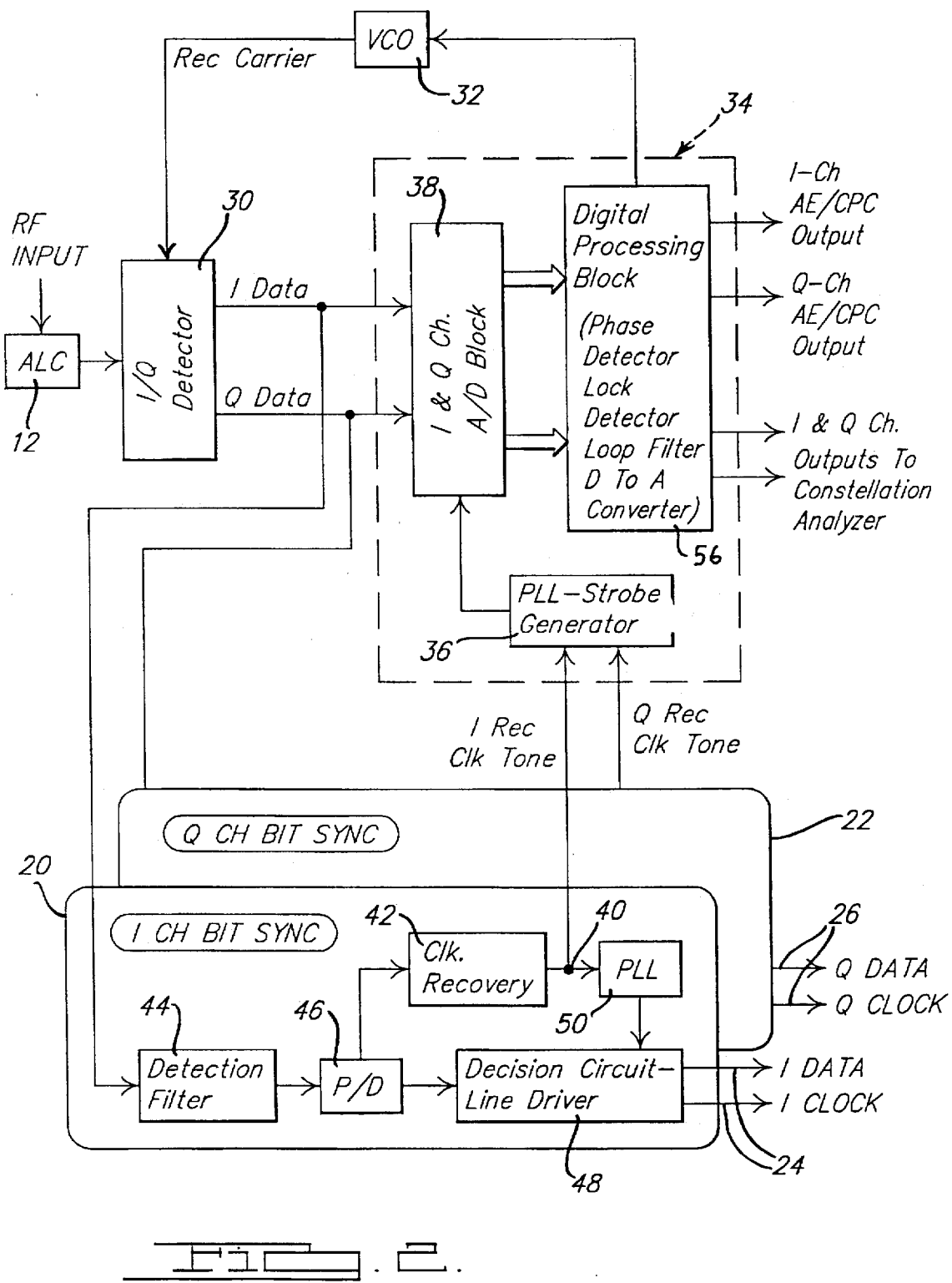
FIG. 2 depicts the subsampling carrier recovery circuitry of the demodulation circuit in accordance with the present invention.

Referring now to FIG. 2, the present invention will be illustrated in conjunction with its presently preferred form. The input modulated RF signal is supplied to the ALC circuit 12 and then immediately to the detector circuit 30, without the need for any intermediate downconversion. A voltage controlled oscillator (VCO) 32 supplies a locally generated carrier used by detector circuit 30. Voltage controlled oscillator 32 is in turn controlled by the subsampling circuitry shown generally at 34, which is more fully discussed below.

As with the illustration of FIG. 1, it has been assumed that the input signal carries both inphase and quadrature channel information. Thus detector 30 provides both I data and Q data outputs. Of course, the invention is not limited to a "four phase" modulation format, since the techniques illustrated herein are generally applicable to many different modulation techniques. The I data and Q data signals are fed to the I channel and Q channel bit synchronizing circuits 20 and 22 and these circuits provide usable data streams and clock signals at outputs 24 and 26, respectively. In addition, the I channel and Q channel bit synchronizing circuits also supply their respective clock signals to a phase locked loop strobe generator circuit 36. This circuit combines and divides the clock rate by N (e.g. N is between 4 to 80) so that it can be used as a strobe signal or clock signal for the analog to digital converter block 38. The purpose of analog to digital converter block 38 is discussed more fully below.

The I channel and Q channel bit synchronizing circuits are constructed essentially the same. Therefore, only the I channel bit synchronizing circuit has been illustrated in detail. Each of the synchronizing circuits is essentially conventional in configuration, except for the inclusion of a tap 40 at which the output of the I and Q channel clock recovery circuits are summed for use by the strobe generator circuit 36. In the preferred embodiment the output clock signal from circuit 42 is divided down, in circuit 36, to produce a subsampling clock, for example, but not limited to, in the 20 MHz range.

The data stream from detector 30 is fed through detection filter 44 and then to power divider (P/D) circuit 46 where the signal is split into two. One of the two signals is fed to the decision circuit 48 and the other is fed to clock recovery circuit 42.

Decision circuitry 48 may be implemented using a comparator/D flipflop in which the output of power divider circuit 46 is fed to the D input. Clock recovery circuit 42 can be implemented in a variety of different ways. Essentially clock recovery circuit 42 is responsible for deriving a signal that is in synchronism with the bit data stream. The presently preferred embodiment uses a differentiator device to obtain a recovered clock signal and this signal is fed to phased lock loop circuit 50 for driving the decision circuit 48 and also fed to strobe generator circuit 36.

In the presently preferred embodiment the clock recovery differentiator circuit may be simply and economically fabricated using a quarter wave, shorted stub transmission line to perform the differentiation. The quarter wave, shorted stub has the advantage of good performance and being economical. While the shorted stub differentiator is presently preferred, other clock recovery circuits can be used. These include the filter and square circuit where the essentially square wave data stream is heavily filtered to produce a sine wave-like waveform and the sine wave-like waveform is squared (multiplied with itself) to produce a strong clock component.

The output of strobe generator 36 is used to strobe the I and Q channel data from detector 30 through analog to digital conversion block 38 at the subsampling rate. The analog to digital conversion block holds the values of the subsampled data between strobe signals. Thus, for example, if the subsampling rate is 40 times lower than the symbol rate, then every $40^{th}$ bit of the I and Q data will be sampled and held by the analog to digital converter block 38.

The output of analog to digital conversion block 38 is fed to the digital processing block 56 where the phase error of the vector formed by the subsampled I and Q data is calculated and filtered by a digital loop filter. The output of the loop filter is converted to an analog signal by a digital to analog converter. The D/A converter output is used to drive the VCO block 32.

If the locally generated carrier and the incoming modulated carrier are in precise phase match, i.e., no phase error output out of the phase detector portion of the digital processing block 56, then there will be no crosstalk between the I and Q data channels.

Crosstalk, due to a phase error between the locally generated carrier and the incoming modulated carrier, is utilized by the digital signal processing block 56 to derive an error signal which is then fed back to voltage controlled oscillator 32 to appropriately change the phase of the voltage controlled oscillator in order to bring the locally generated carrier into phase alignment with the received modulated carrier.

Figure 3:
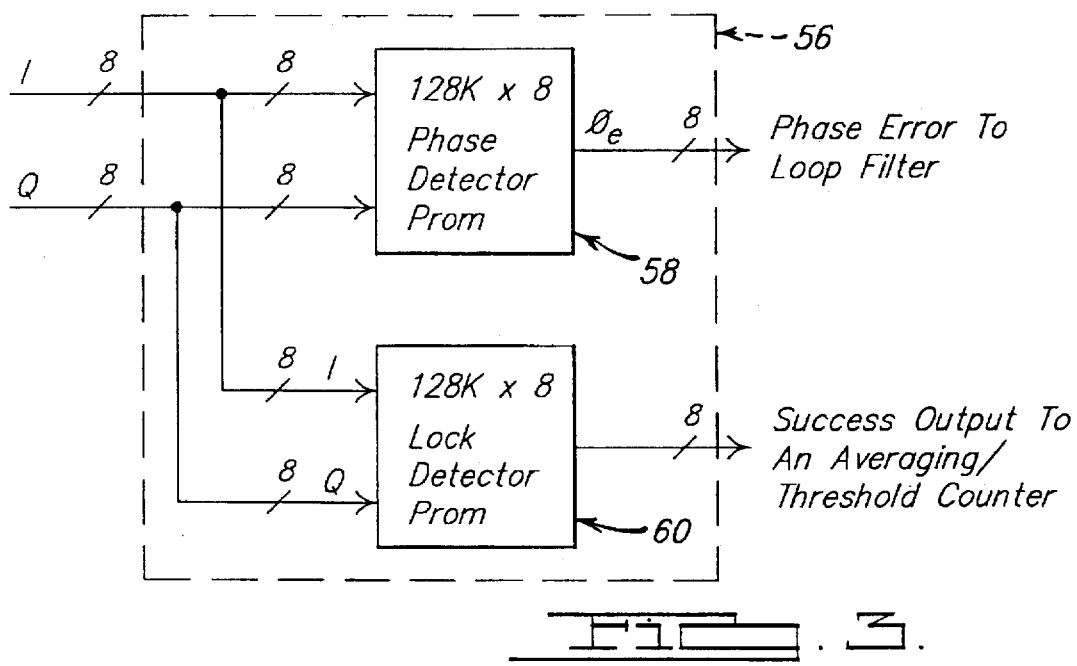
FIG. 3 depicts a phase detector and lock detector circuit which may be implemented using the present invention.

The presently preferred embodiment performs the digital processing block function using the circuitry illustrated in FIG. 3.

Referring to FIG. 3, digital processing block 56 includes a phase detector PROM 58 and a lock detector PROM 60. The presently preferred embodiment employs 8 bit analog to digital conversion stages and the PROMs 58 and 60 are 8 bits wide. In the presently preferred embodiment each PROM has the capacity to store 128K bytes. The subsampled I and Q data from analog to digital conversion block 38 are fed to the address ports of PROMs 58 and 60. Inasmuch as the presently preferred embodiment employs 8 bits to represent the I channel and 8 bits to represent the Q channel, the resulting address is a 16 bit address (8+8). Conceptually, each PROM can be viewed as lookup tables (like a spreadsheet) with the I data values representing columns and the Q data values representing rows. Thus each I and Q value (the actual voltages of the data signal) correspond to a data cell or memory location within PROM 58 and also within PROM 60. Stored in these data cells or memory locations are the appropriate error signals needed to bring the locally generated carrier into phase synchronization and frequency lock.

Figure 4:
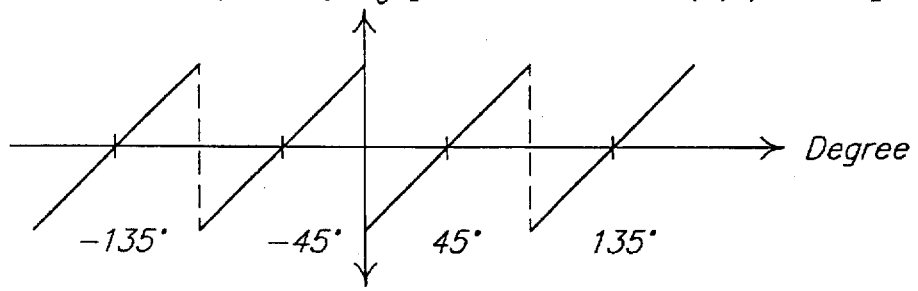
FIG. 4 is a graph depicting the characteristics of the phase detector circuit of FIG. 3.

More specifically, PROM 58 contains lookup data values specific to each modulation format. For example for SQPSK/QPSK the PROM values are modeled after the graph depicted in FIG. 4. FIG. 4 represents the linear phase detection curve of the presently preferred embodiment for the SQPSK/QPSK example. The subsampled I and Q data are used to address a given memory location in PROM 58 and resultant value (corresponding to the data of FIG. 4) is used as the phase error value. The phase error value is in turn fed to control the voltage controlled oscillator 30 in order to correct the phase error by adjusting the frequency of the voltage controlled oscillator sufficiently to reduce the phase error to near 0.

Figure 5:
FIG. 5 is a graph depicting the lock detector characteristics of the lock detector circuit of FIG. 3.

The lock detector PROM 60 works in a similar fashion. In this case, lock detector PROM 60 is loaded with data values represented by the data of FIG. 5. The lock detector functions to determine whether the voltage controlled oscillator 30 is or is not within close enough synchronization with the incoming modulated carrier to constitute signal lock. As illustrated in FIG. 5, the presently preferred embodiment monitors whether the vector formed by the sampled I and Q data values is within a predetermined sector, in this case a sector of 48°. This constitutes a success. During acquisition or loss of lock, several "fails" outside this sector will occur. These successes and fails are counted. If the number of fails exceeds a threshold, a carrier unlock state is declared. The lock detection signal can be used, for example, to control a sweep aided acquisition circuit (not shown). A sweep aided acquisition circuit typically will drive the voltage controlled oscillator in an open loop sweep (without closed loop phase lock) while the lock detector signal is monitored. Once lock detection occurs (i.e., once the signal is within the predetermined inclusion region, typically 48°, for a long enough time to not cause the number of fails to exceed the threshold), the sweep aided acquisition circuit is switched off and the voltage controlled oscillator is placed in a closed loop phase locked condition where the output of phase detector PROM 58 takes over control.

From the foregoing it will be seen that the present invention provides a carrier recovery mechanism which lends itself well to economical digital implementation by utilizing a subsampling technique. Advantageously, the subsampling is accomplished using the bit synchronizing circuitry which also provides the demodulated data and the data clock. The invention can be implemented in a variety of different configurations and it should therefore be understood that the present invention is not limited to the specific embodiment illustrated herein. On the contrary, various modifications can be made without departing from the spirit and scope of the invention as set forth in the appended claims.

We claim:

1. A method of processing an information carrying input signal impressed on a carrier, comprising:

detecting the input signal using an electrically controlled oscillator to generate a local carrier signal and extracting the local carrier signal from the input signal to recover a detected analog signal, said analog signal having a symbol rate;

producing a recovered clock signal in synchronism with the symbol rate of said analog signal;

subsampling the analog signal in an analog to digital conversion process at a sampling rate which is a function of said recovered clock signal, said sampling rate being lower than said symbol rate by a predetermined factor to generate a converted digital signal; and using the converted digital signal to produce a feedback signal used to control the electrically controlled oscillator and to thereby lock the frequency and phase of the local carrier signal to that of the carrier of the input signal.

2. The method of claim 1 wherein the analog signal is subsampled by a predetermined factor having a range of about 4 to 80 times lower than the symbol rate of the analog signal.

3. The method of claim 1 wherein said feedback signal is produced by performing baseband phase error detection processing using the digital signal.

4. The method of claim 1 wherein said feedback signal is produced by storing predetermined phase error data as a lookup table in memory and using said digital signal to address the memory and thereby selectively obtain one of said phase error data for use in producing said feedback signal.

5. The method of claim 1 further comprising providing a lock detection signal by storing predetermined lock detector data as a lookup table in memory and using said digital signal to address the memory and thereby selectively obtain one of said lock detector data for use in producing a lock detection signal.

6. The method of claim 1 wherein said feedback signal is produced by digital loop filtering of the digital signal.

7. The method of claim 1 wherein said input signal includes both I and Q channels and wherein said detecting step is performed with respect to both I and Q channels.

8. The method of claim 1 wherein said input signal includes both I and Q channels and wherein said subsampling step is performed with respect to both I and Q channels.

9. The method of claim 1 wherein said input signal includes both I and Q channels and wherein clock recovery is performed with respect to both I and Q channels.

10. The method of claim 1 wherein said input signal includes both I and Q channels and wherein said analog to digital conversion process is performed with respect to both I and Q channels.

11. The method of claim 1 wherein said recovered clock is processed in a phase locked loop prior to being used to strobe the detected analog signal.

12. An apparatus for carrier recovery in a communication receiver, comprising:
   a detector circuit for extracting a detected analog signal from an incoming modulated signal, said detected analog signal having a symbol rate;
   a synchronizing circuit coupled to said detector circuit for receiving said detected analog signal and producing a synchronized clock signal having a frequency lower than the symbol rate by a predetermined factor;
   a subsampling circuit coupled to said synchronizing circuit and to said detector circuit for producing a subsampled signal at a rate corresponding to said synchronized clock signal;
   a processing circuit coupled to said subsampling circuit responsive of said subsampled signal for producing a feedback signal based on said subsampled signal; and
   an oscillator circuit coupled to said processing circuit and responsive of said feedback signal, said oscillator circuit producing a recovered carrier signal in accordance with said feedback signal, and said oscillator circuit providing said recovered carrier signal to said detector circuit.

13. The apparatus of claim 12 wherein said oscillator circuit is coupled to said detector circuit and supplies said recovered carrier signal to said detector circuit for use in extracting said detected analog signal.

14. The apparatus of claim 12 wherein said incoming modulated signal carries digital information and wherein said synchronizing circuit further comprises a bit synchronizing circuit coupled to said detector circuit for extracting a digital clock signal from said detected analog signal.

15. The apparatus of claim 14 wherein said bit synchronizing circuit is coupled to said subsampling circuit whereby said digital clock signal is supplied to said subsampling circuit as a strobe signal for controlling the subsampling of said detected analog signal.

16. The apparatus of claim 12 wherein said subsampled signal represents a digital value and wherein said processing circuit comprises addressable memory containing a data indicative of a plurality of feedback signals selectively addressed by the digital value of said subsampled signal.

17. The apparatus of claim 12 wherein said oscillator circuit produces a recovered carrier signal at a frequency dictated by said feedback signal.

18. The apparatus of claim 12 wherein said oscillator circuit produces a recovered carrier signal at a phase dictated by said feedback signal.

19. The apparatus of claim 12 wherein said subsampling circuit includes analog to digital converter coupled to said detector circuit and a strobe generating circuit for strobing said detected analog signal through said analog to digital converter at a sampling rate lower than the symbol rate of the incoming modulated signal.

20. The apparatus of claim 12 wherein said detector circuit has I and Q channels for producing I and Q detected analog signals and wherein said subsampling circuit receives said I and Q detected analog signals and produces I and Q subsampled signals together representing a pair of digital values and wherein said processing circuit comprises addressable memory containing a data indicative of a plurality of feedback signals selectively addressed by said pair of digital values.

21. A method of processing an information carrying input signal impressed on a carrier, comprising:
   detecting the input signal using an electrically controlled oscillator to generate a local carrier signal and extracting the local carrier signal from the input signal to recover a detected analog signal, said analog signal having a symbol rate;
   producing a recovered clock signal in synchronism with the symbol rate of said analog signal;
   subsampling the analog signal at a sampling rate lower than the symbol rate by a predetermined factor to produce a subsampled signal;
   using the subsampled signal to recover a carrier;
   using the recovered clock signal to strobe the detected analog signal through an analog to digital conversion process whereby the analog signal is converted to a digital signal;
   using the digital signal to produce a feedback signal used to control the frequency electrically controlled oscillator and to thereby lock the frequency and phase of the local carrier signal to that of the carrier of the input signal.

22. The method of claim 21 wherein the analog signal is subsampled by a predetermined factor in the range of about 20 to 50 times lower than the clock frequency.

23. The method of claim 21 wherein said feedback signal is produced by performing phase detection and filtering on the digital signal.

24. The method of claim 21 wherein said feedback signal is produced by storing predetermined phase error data as a lookup table in memory and using said digital signal to address the memory and thereby selectively obtain one of said phase error data for use in producing said feedback signal.

25. The method of claim 21 further comprising providing a lock detection signal by storing predetermined lock detector data as a lookup table in memory and using said digital signal to address the memory and thereby selectively obtain one of said lock detector data for use in producing a lock detection signal.

26. The method of claim 21 wherein said feedback signal is produced by digital loop filtering of the digital signal.

27. The method of claim 21 wherein said input signal includes both I and Q channels and wherein said detecting step is performed with respect to both I and Q channels.

28. The method of claim 21 wherein said input signal includes both I and Q channels and wherein said subsampling step is performed with respect to both I and Q channels.

29. The method of claim 21 wherein said input signal includes both I and Q channels and wherein said clock recovery step is performed with respect to both I and Q channels.

30. The method of claim 21 wherein said input signal includes both I and Q channels and wherein said analog to digital conversion process is performed with respect to both I and Q channels.

31. The method of claim 21 wherein said recovered clock is processed in a phase locked loop prior to being used to strobe the detected analog signal.

32. A method of processing information carrying input signals impressed on a carrier by way of a plurality of different modulations types, said method comprising:

detecting an input signal using an electrically controlled oscillator to generate a local carrier signal and extracting the local carrier signal from the input signal to recover a detected analog signal;

subsampling the analog signal in an analog digital conversion process to convert the analog signal to a digital signal;

storing a plurality of different predetermined phase error data corresponding to the plurality of different modulation types as remote lookup tables in a memory;

based on the modulation type of the input signal, selectively accessing one of said tables corresponding to the modulation type of the input signal; and using said digital signal to address the memory of the selected table to obtain given feedback error data for use in producing a feedback signal to control the frequency of the electrically controlled oscillator to thereby lock the frequency of the local carrier signal to that of the carrier of the input signal.

33. A method of processing information carrying input signals impressed on a carrier by way of a plurality of different modulation types, said method comprising:

detecting an input signal using an electrically controlled oscillator to generate a local carrier signal; and extracting the local carrier signal from the input signal to recover a detected analog signal having a data frequency;

subsampling the analog signal at a sampling frequency lower than said data frequency to produce a subsampled signal;

using the subsampled signal to recover a carrier;

strobing the detected analog signal through an analog-to-digital conversion process to convert the analog signal to a digital signal;

storing a plurality of different predetermined phase error data corresponding to the plurality of different modulation types as lookup tables in a memory;

based on the modulation type of the input signal, selectively accessing one of said tables corresponding to the modulation type of the input signal; and using said digital signal to address the memory of the selected table to obtain one of said phase error data for use in producing a feedback signal to control the electrically controlled oscillator to thereby lock the frequency of the local carrier signal to that of the carrier of the input signal.

34. A method of processing an information carrying input signal impressed on a carrier, comprising:

detecting the input signal using an electrically controlled oscillator to generate a local carrier signal and extracting the local carrier signal from the input signal to recover a detected analog signal, said analog signal having a symbol rate;

producing a recovered clock signal in synchronism with the symbol rate of said analog signal;

subsampling the analog signal in an analog to digital conversion process at a sampling rate which is a function of said recovered clock signal to generate a converted digital signal, said sampling rate being lower than said symbol rate by a factor of at least 1/N, where N is greater than 1, said converted digital signal containing frequency and phase attributes relating to the carrier; and using the converted digital signal to produce a feedback signal used to control the electrically controlled oscillator and to thereby lock the frequency and phase of the local carrier signal to that of the carrier of the input signal.

* * * * *